United States Patent
Ishikawa et al.

(10) Patent No.: US 8,728,672 B2
(45) Date of Patent: May 20, 2014

(54) FUEL CELL SYSTEM

(75) Inventors: Tomotaka Ishikawa, Aichi-gun (JP); Keigo Suematsu, Toyota (JP); Nobuo Watanabe, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/320,194

(22) PCT Filed: May 14, 2009

(86) PCT No.: PCT/JP2009/058990
§ 371 (c)(1),
(2), (4) Date: Nov. 11, 2011

(87) PCT Pub. No.: WO2010/131351
PCT Pub. Date: Nov. 18, 2010

(65) Prior Publication Data
US 2012/0058404 A1    Mar. 8, 2012

(51) Int. Cl.
*H01M 8/06* (2006.01)

(52) U.S. Cl.
USPC .................................... 429/413; 429/427

(58) Field of Classification Search
None
See application file for complete search history.

(56) References Cited

U.S. PATENT DOCUMENTS

| | | | |
|---|---|---|---|
| 6,524,733 B1 * | 2/2003 | Nonobe | 429/413 |
| 6,562,501 B1 * | 5/2003 | Nagamiya et al. | 429/413 |
| 2002/0192520 A1 | 12/2002 | Nonobe | |
| 2007/0184314 A1 | 8/2007 | Kagami | |
| 2009/0169934 A1 | 7/2009 | Manabe et al. | |

FOREIGN PATENT DOCUMENTS

| | | |
|---|---|---|
| CN | 1890832 A | 1/2007 |
| CN | 101213696 A | 7/2008 |
| JP | 2000-243418 A | 9/2000 |
| JP | 2007-188665 A | 7/2007 |
| JP | 2008-047368 A | 2/2008 |
| JP | 2008-123783 A | 5/2008 |
| JP | 2009-026483 A | 2/2009 |

OTHER PUBLICATIONS

International Search Report mailed Aug. 4, 2009 of PCT/JP2009/058990.

* cited by examiner

*Primary Examiner* — Patrick Ryan
*Assistant Examiner* — Christopher Domone
(74) *Attorney, Agent, or Firm* — Kenyon & Kenyon LLP

(57) ABSTRACT

The moisture state of a fuel cell is determined without causing any variation in the supply state of the reactant gas to be supplied to the fuel cell. An output current control section temporarily performs a current sweep while maintaining the amount of oxidant gas to be supplied to the fuel cell. A resistance component calculation section calculates the resistance component in the fuel cell by using an output current value and an output voltage value of the fuel cell being that of when the current sweep is temporarily performed. A moisture content calculation section calculates the moisture content in the fuel cell by using the resistance component. A moisture content determination section determines whether or not the moisture content is equal to or lower than a dry state threshold value. A moisture content increasing processing section performs a moisture content increasing process when the moisture content is equal to or lower than the dry state threshold value.

7 Claims, 8 Drawing Sheets

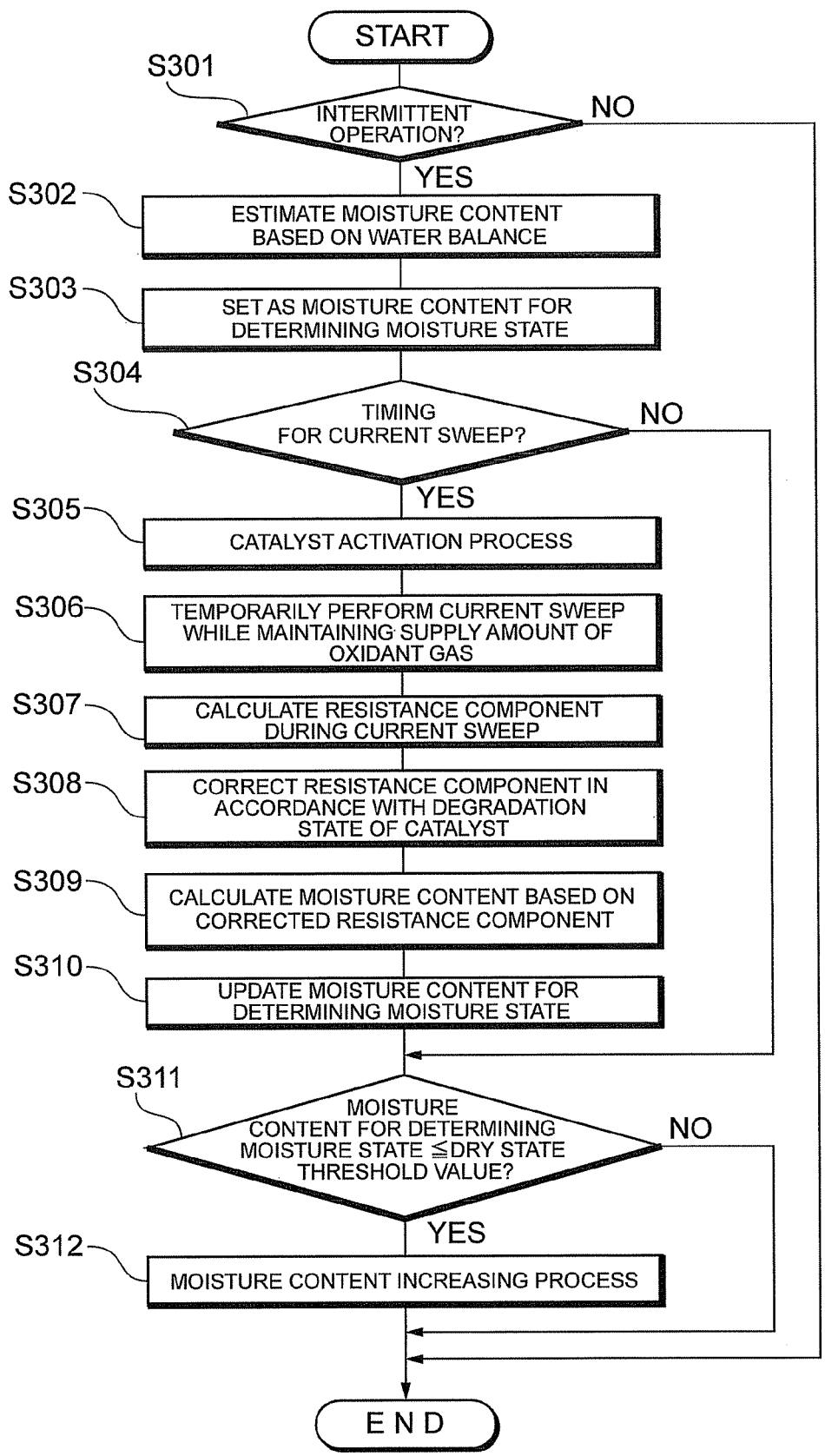

FUEL CELL SYSTEM

This is a 371 national phase application of PCT/JP2009/058990 filed 14 May 2009, the contents of which are incorporated herein by reference.

TECHNICAL FIELD

The present invention relates to a fuel cell system.

BACKGROUND ART

The below Patent Document 1 discloses a technique for diagnosing the moisture content in a fuel cell of a fuel cell system. In this fuel cell system, the rate of change of a cell voltage when the output current of the fuel cell is changed by a certain rate of change is determined, and the moisture content in the fuel cell is diagnosed in accordance with the difference between the rate of change of the cell voltage and the rate of change of the pre-set reference voltage.

PRIOR ART REFERENCES

Patent Documents

Patent Document 1: Japanese laid-open patent publication No. 2008-123783

SUMMARY OF THE INVENTION

Problem to be Solved by the Invention

In the above fuel cell system, when the output current of the fuel cell is changed by a certain rate of change, the amount of fuel gas to be supplied to the fuel cell is changed. When the supply amount of the fuel gas is changed, the conditions of pressure, amount of generated water, etc. vary, and thereby cause difficulty in accurately diagnosing the moisture content in the fuel cell.

The present invention is for overcoming the problems by the prior art described above, and its object is to provide a fuel cell system that is capable of determining the moisture state of the fuel cell without causing any variance in the supply state of the reactant gas to be supplied to the fuel gas.

Means for Solving the Problem

In order to solve the above problem, the fuel cell system according to the present invention comprises: a fuel cell including a cell stack body in which a plurality of unit cells is stacked, the fuel cell generating electric power through an electrochemical reaction of a reactant gas which is supplied to the cell stack body; an output current control means for temporarily increasing an output current of the fuel cell while maintaining an amount of the reactant gas to be supplied to the fuel cell; and a moisture state determination means for determining a moisture state in the fuel cell by using an output voltage of the fuel cell being that of when the output current is temporarily increased by the output current control means.

According to the present invention, it is capable of determining the moisture state in the fuel cell while maintaining the amount of reactant gas to be supplied to the fuel cell.

The above fuel cell system may further comprise a moisture content increasing means for performing a moisture content increasing process which increases the moisture content in the fuel cell, when it is determined by the above moisture state determination means that the moisture state in the fuel cell is a dry state.

This enables the moisture content in the fuel cell to be increased when the inside of the fuel cell is in a dry state.

In the above fuel cell system, the above moisture state determination means may include: a resistance component calculation means for calculating a resistance component from an output current value and an output voltage value of the fuel cell being that of when the output current is temporarily increased by the output current control means; a moisture content calculation means for calculating the moisture content in the fuel cell corresponding to the resistance component calculated by the resistance component calculation means; and a moisture content determination means for determining whether or not the moisture content calculated by the moisture content calculation means is equal to or lower than a dry state threshold value, which is for determining the dry state, wherein the moisture content increasing means performs the moisture content increasing process when it is determined by the moisture content determination means that the moisture content is equal to or lower than the dry state threshold value.

This enables the moisture content in the fuel cell to be calculated based on the resistance component in the fuel cell, and the moisture content in the fuel cell to be increased when the calculated moisture content is equal to or lower than the dry state threshold value.

In the above fuel cell system, the above moisture state determination means may further include a moisture content estimation means for estimating the moisture content in the fuel cell by using a value obtained after subtracting an amount of water carried outside the fuel cell from an amount of water generated by a power generation of the fuel cell, wherein when the dry state in the fuel cell is to be determined, the moisture content determination means determines whether or not the calculated moisture content is equal to or lower than the dry state threshold value when the moisture content is calculated by the moisture content calculation means, and determines whether or not the moisture content estimated by the moisture content estimation means is equal to or lower than the dry state threshold value when the moisture content is not calculated by the moisture content calculation means.

This enables the moisture state of the fuel cell to be accurately determined since the estimated moisture content in which errors easily occur can be corrected by the highly accurate moisture content which is calculated by the moisture content calculation means.

In the above fuel cell system, the above output current control means may temporarily increase an output current of the fuel cell while maintaining a supply amount of the reactant gas, when the fuel cell is during an intermittent operation.

This enables the resistance component to be accurately calculated since a so-called current sweep can be performed under a situation where the supply amount, pressure, etc. of the reactant gas do not vary.

The above fuel cell system may further comprise a catalyst activation means for outputting, during the intermittent operation, a current from the fuel cell such that a voltage of the fuel cell is within a reduction region of a catalyst included in the fuel cell, wherein the resistance component calculation means corrects the resistance component in accordance with a degradation state of the catalyst activated by the catalyst activation means.

This enables the degradation state of the catalyst to be determined after the catalyst is activated during the intermittent operation and the resistance component to be corrected in accordance with the determined degradation state.

The above fuel cell system may further comprise: a power consuming apparatus that consumes electric power from the fuel cell; and a gas supply amount control means for increasing a supply amount of the reactant gas in accordance with a required amount of power generation, when the required amount of power generation from the power consuming apparatus is increased while the output current is temporarily increased by the output current control means, wherein the resistance component calculation means corrects the resistance component when the supply amount of the reactant gas is increased by the gas supply amount control means.

This enables a smooth response to the required load without causing any delay for supplying the reactant gas since a current sweep can be performed while supplying the reactant gas in accordance with the required amount of power generation even if the required amount of power generation is increased during the current sweep.

The above fuel cell system may further comprise a moisture content decreasing means for performing a moisture content decreasing process which decreases the moisture content in the fuel cell, when it is determined by the moisture state determination means that the moisture state in the fuel cell is a wet state.

This enables the moisture content in the fuel cell to be decreased when the inside of the fuel cell is in a wet state.

In the above fuel system, the above moisture state determination means may include a cell voltage determination means for determining whether or not any of the voltages detected by a cell voltage detection section that detects the voltage of the unit cell has reached a wet state threshold value or lower, which is for determining the wet state, while the output current is temporarily increased by the output current control means, wherein the moisture content decreasing means performs the moisture content decreasing process when it is determined by the cell voltage determination means that the voltage has reached the wet state threshold value or lower.

This enables the detection of whether or not the inside of the fuel cell is in a wet state by determining whether or not the cell voltage is equal to or lower than the wet state threshold value, and when the inside of the fuel cell is in a wet state, the moisture content in the fuel cell may be decreased.

Effect of the Invention

According to the present invention, the moisture state of the fuel cell can be determined without causing any variance in the supply state of the reactant gas to be supplied to the fuel cell.

BRIEF DESCRIPTION OF THE DRAWINGS

FIG. 8 is a flow chart for explaining a moisture state determination process in a third embodiment.

MODE FOR CARRYING OUT THE INVENTION

Preferred embodiments of a fuel cell system according to the present invention will be described below with reference to the attached drawings. Each embodiment will describe a case where the fuel cell system according to the present invention is used as an in-vehicle power generation system for a fuel cell hybrid vehicle (FCHV). The fuel cell system according to the present invention may also be applied to various mobile objects other than fuel cell hybrid vehicles (e.g., robots, ships and airplanes) and also to stationary power generation systems used as power generation facilities for constructions (houses, buildings, etc.).

First Embodiment

Figure 1:
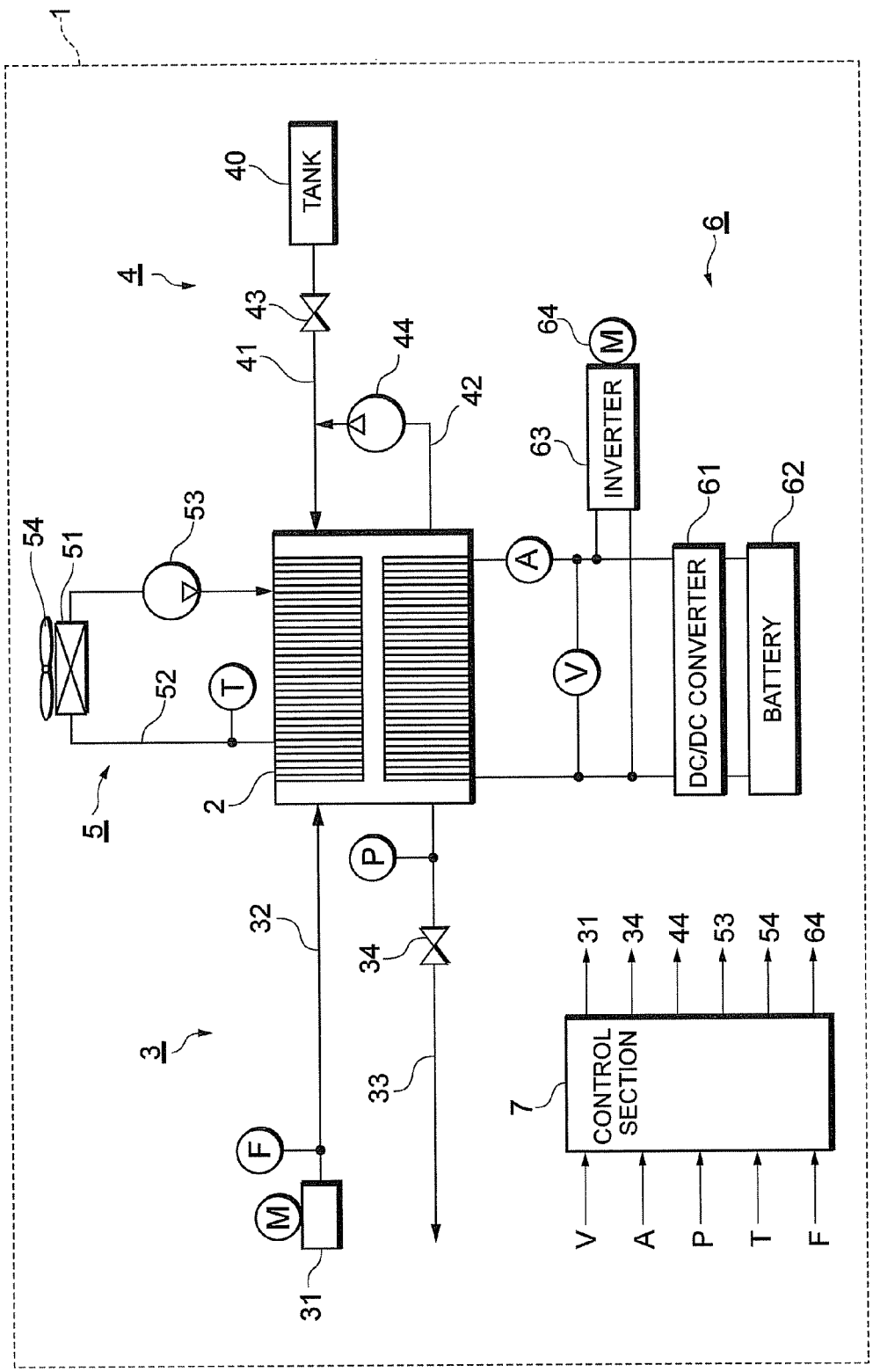
FIG. 1 is a configuration diagram schematically showing a fuel cell system in each embodiment.

First, the configuration of a fuel cell system in the first embodiment will be described with reference to FIG. 1. FIG. 1 is a configuration diagram schematically showing the fuel cell system in the first embodiment.

As shown in FIG. 1, the fuel cell system 1 includes: a fuel cell 2 that is supplied with an oxidant gas and a fuel gas as reaction gases and generates electric power through an electrochemical reaction; an oxidant gas piping system 3 that supplies air as the oxidant gas to the fuel cell 2; a fuel gas piping system 4 that supplies hydrogen as the fuel gas to the fuel cell 2; a cooling system 5 that circulates and supplies cooling water to the fuel cell 2; an electric power system 6 that charges and discharges an electric power of the system; and a control section 7 that centrally controls the entire system.

The fuel cell 2 is, for example, a polymer electrolyte fuel cell and has a stack structure in which a plurality of unit cells is stacked. The unit cells each have a cathode (air electrode) on one surface of an electrolyte constituted from an ion-exchange membrane and an anode (fuel electrode) on the other surface of the electrolyte. For electrodes including cathodes and anodes, platinum Pt based on a porous carbon material is used as a catalyst (electrode catalyst). The unit cell further includes a pair of separators which sandwich the anode and the cathode therebetween. In this configuration, the hydrogen gas is supplied to a hydrogen gas flow path in one separator, while the oxidant gas is supplied to an oxidant gas flow path in the other separator, and these reaction gases chemically react with each other to generate electric power.

The fuel cell 2 is provided with a voltage sensor V that detects an output voltage of the fuel cell and a current sensor A that detects an output current of the fuel cell. Each unit cell of the fuel cell 2 is provided with a cell monitor (a cell voltage detection section, not shown) for detecting a voltage in the unit cell.

The oxidant gas piping system 3 includes: a compressor 31 that compresses the air introduced through a filter and sends out the compressed air as the oxidant gas; an oxidant gas supply flow path 32 for supplying the oxidant gas to the fuel cell 2; and an oxidant-off gas exhaust flow path 33 for exhausting the oxidant-off gas exhausted from the fuel cell 2.

The outlet side of the compressor 31 is provided with a flow rate sensor F which measures the flow rate of the oxidant gas discharged from the compressor 31. The oxidant-off gas exhaust flow path 33 is provided with a back pressure valve 34 which adjusts the pressure of the oxidant gas in the fuel cell 2. A pressure sensor P which detects the pressure of the oxidant gas in the fuel cell 2 is provided on the outlet side of the fuel cell 2 of the oxidant-off gas exhaust flow path 33.

The fuel gas piping system 4 includes: a fuel tank 40 serving as a fuel supply source which stores fuel gas having a high pressure; a fuel gas supply flow path 41 for supplying the fuel gas in the fuel tank 40 to the fuel cell 2; and a fuel circulation flow path 42 for returning a fuel-off gas exhausted from the fuel cell 2 to the fuel gas supply flow path 41. The fuel gas supply flow path 41 is provided with a pressure regulating valve 43 that regulates the pressure of the fuel gas to a preset secondary pressure, and the fuel circulation flow path 42 is provided with a fuel pump 44 that pressurizes the fuel-off gas in the fuel circulation flow path 42 and sends the fuel gas towards the fuel gas supply flow path 41.

The cooling system 5 includes: a radiator 51 that cools the cooling water; a cooling water circulation flow path 52 for circulating and supplying the cooling water to the fuel cell 2 and the radiator 51; and a cooling water pump 53 that circulates the cooling water in the cooling water circulation flow path 52. The radiator 51 is provided with a radiator fan 54. The outlet side of the fuel cell 2 of the cooling water circulation flow path 52 is provided with a temperature sensor T that detects the temperature of the cooling water. The position for the temperature sensor T to be provided may be at the inlet side of the fuel cell 2.

The electric power system 6 includes: a DC/DC converter 61; a battery 62 which is a secondary battery; a traction inverter 63; a traction motor 64 as a power-consuming apparatus; and various auxiliary inverters which are not shown. The DC/DC converter 61 is a direct-current voltage converter, which has: a function of regulating a direct-current voltage input from the battery 62 and outputting the regulated voltage to the traction inverter 63; and a function of regulating a direct-current voltage input from the fuel cell 2 or the traction motor 64 and outputting the regulated voltage to the battery 62. These functions of the DC/DC converter 61 charge and discharge the battery 62.

The battery 62 includes stacked battery cells and provides a certain high voltage as a terminal voltage, the battery 62 being capable of being charged with surplus power and supplying electric power in an auxiliary manner under the control of a battery computer (not shown). The traction inverter 63 converts a direct current to a three-phase alternating current, and supplies the three-phase alternating current to the traction motor 64. The traction motor 64 is, for example, a three-phase alternating current motor, which constitutes a main power source for a fuel cell hybrid vehicle equipped with the fuel cell system 1. The auxiliary inverters are electric motor control units which control the drive of respective motors, and the auxiliary inverters convert a direct current to a three-phase alternating current and supply the three-phase alternating current to the respective motors.

The control section 7 measures the amount of operation of an acceleration member (an accelerator) provided in a fuel cell hybrid vehicle, receives control information such as an acceleration request value (e.g., the amount of power generation required by power-consuming apparatuses such as the traction motor 64), and controls the operation of various appliances in the system. Examples of the power-consuming apparatuses may include, in addition to the traction motor 64, auxiliary apparatuses required for operating the fuel cell 2 (e.g., motors for the compressor 31, fuel pump 44, cooling water circulation pump 53, etc.); actuators used in various apparatuses relevant to the travel of the vehicle (e.g., speed change gears, wheel control apparatuses, steering gears and suspensions); and air-conditioning apparatuses (air conditioners), lighting equipment, audio systems, etc. which are provided in passenger compartments.

The control section 7 physically includes, for example: a CPU; a memory; and an input-output interface. The memory includes, for example, a ROM that stores a control program and control data which are processed by the CPU and a RAM primarily used as various work areas for control processing. These elements are connected to each other via a bus. The input-output interface is connected to various sensors such as the voltage sensor V, the current sensor A, the pressure sensor P, the temperature sensor T and the flow rate sensor F, as well as various drivers for driving the compressor 31, the fuel pump 44 and the cooling water circulation pump 53, etc.

The CPU receives measurement results in the respective sensors via the input-output interfaces, and processes the received measurement results using various types of data in the RAM, in accordance with the control program stored in the ROM, thereby performing various control processes. The CPU outputs control signals to the various drivers via the input-output interfaces, thereby controlling the entire fuel cell system 1. A moisture state determination process performed by a control section 7 of the first embodiment will be described below. The moisture state determination process in the first embodiment is performed during a normal operation. Operation states of the fuel cell include a normal operation and an intermittent operation. The intermittent operation is an operation mode which allows the fuel cell hybrid vehicle to run only with the electric power supplied from the battery 62, and the normal operation is an operation mode other than the intermittent operation.

Figure 2:
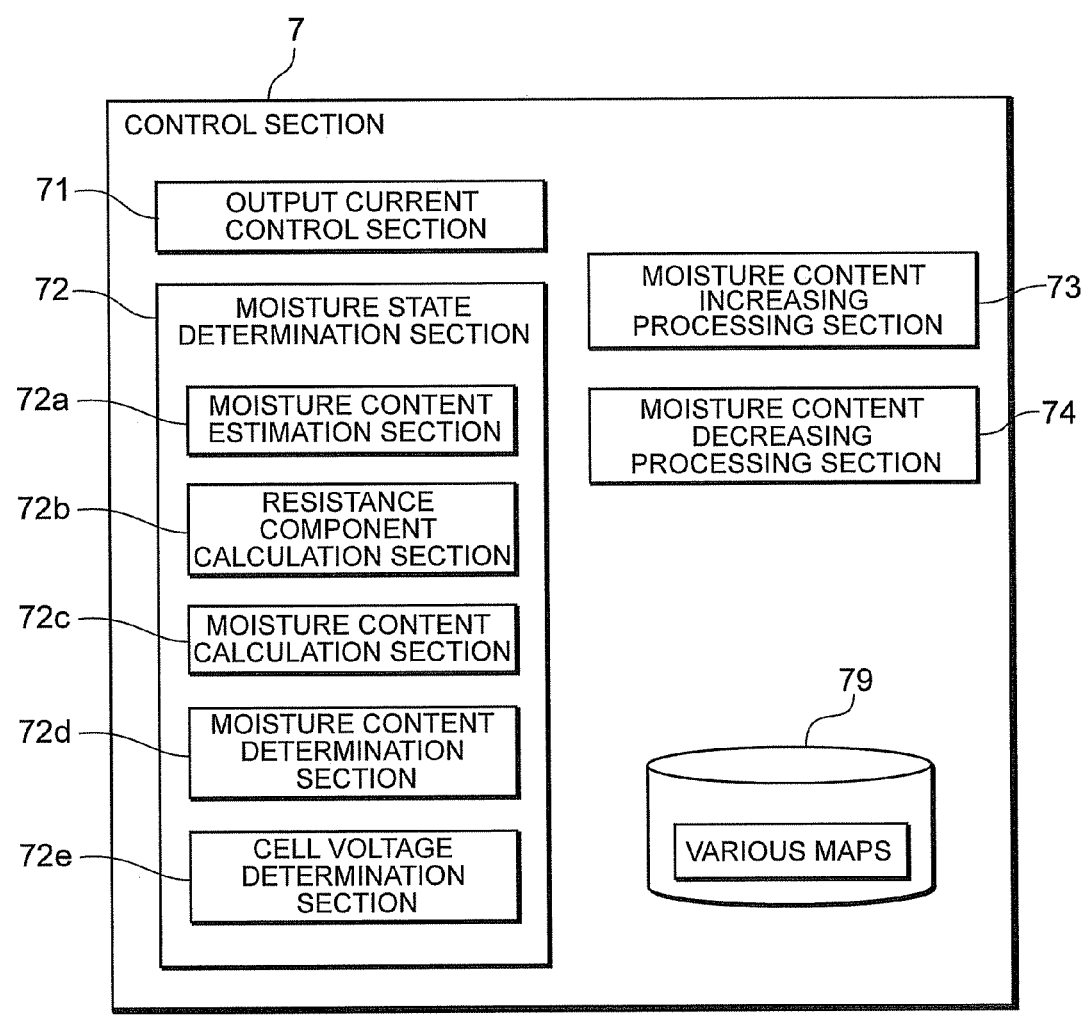
FIG. 2 is a block diagram showing a functional configuration of a control section in a first embodiment.

As shown in FIG. 2, the control section 7 functionally includes: an output current control section 71 (output current control means); a moisture state determination section 72 (moisture state determination means); a moisture content increasing processing section 73 (moisture content increasing means); and a moisture content decreasing processing section 74 (moisture content decreasing means). The memory 79 of the control section 7 stores various maps referenced by each of the above sections.

The output current control section 71 temporarily increases the output current of the fuel cell 2 while maintaining the amount of oxidant gas to be supplied to the fuel cell 2. The increase of the output current is performed by reducing the voltage of the fuel cell 2 to a voltage lower than the required voltage and forcibly taking out a current larger than the required current from the fuel cell 2 (hereinafter referred to as a "current sweep"). The subject to be maintained during the current sweep is not limited to the supply amount of the oxidant gas. The supply amount of the fuel gas may be maintained or the supply amount of both the oxidant gas and the fuel gas may be maintained.

The output current control section 71 temporarily performs the current sweep without changing the supply amount of the oxidant gas, pressure, etc. In general, if the current sweep is performed without changing the supply amount of the oxidant gas, etc., the oxidant gas would be insufficient and the stoichiometry ratio would be decreased to less than 1, thereby not allowing the power generation to continue. However, in the present invention, the decrease in the stoichiometry ratio which occurs during the current sweep is avoided by temporarily performing the current sweep.

This is due to the knowledge that, since oxygen and hydrogen remain in the stack of the fuel cell 2, particularly in the catalyst, even if the current sweep is performed while maintaining the supply amount of the oxidant gas, as long as this is performed only until the remaining oxygen and the remaining hydrogen disappear, the current sweep may be performed with a maintained stoichiometry ratio. Namely, effectively using the remaining oxygen and remaining hydrogen in the stack allows the stoichiometry ratio to be maintained temporarily even if a current sweep is performed while maintaining the supply amount of the oxidant gas. The stoichiometry ratio refers to the ratio of the amount of gas to be supplied to the fuel cell and the amount of gas consumed by the fuel cell, the stoichiometry ratio being represented by the equation, stoichiometry ratio=supply gas amount/consumption gas amount.

The time for performing the current sweep may be set in accordance with the amount of remaining oxygen and remaining hydrogen. For example, the time required for consuming the amount of electric power that can be supplied by the remaining oxygen and the remaining hydrogen can be set as the upper limit time for performing a current sweep. The amount of electric power that can be supplied by the remaining oxygen and the remaining hydrogen can be determined by, for example, the design of stack of the fuel cell, the conditions of the supply amount, pressure, etc. of the oxidant gas and the fuel gas, the moisture content in the fuel cell, etc. If the amount of electric power that can be supplied by the remaining oxygen and the remaining hydrogen is determined, the current needed for the current sweep and the upper limit time of the current sweep can then be determined.

For example, the time required for obtaining the amount of data, in which determination errors which occur when the moisture state in the fuel cell is determined are within the allowable range, can be set as the lower limit time for performing a current sweep. The data obtained during the current sweep is the output current value and the output voltage value of the fuel cell. The determination of the moisture state is determined based on the resistance component that is obtained by dividing the obtained output voltage value by the output current value.

Due to the relationship in which the output current increases as the speed for decreasing the voltage of the fuel cell (hereinafter referred to as the "sweep speed") increases, it is preferable to determine the sweep speed in accordance with the required current. Furthermore, if the voltage of the fuel cell is too low or too high, the remaining oxygen would be decreased since the reduction reaction of the catalyst is reduced. When the remaining oxygen is decreased, the current that could be taken out from the fuel cell would be decreased. Therefore, it is preferable to cause the voltage to vary within the range in which the reduction reaction of the catalyst is not reduced.

The moisture state in the fuel cell can be broadly divided, for example, into an appropriate state, a dry (dry-up) state and a wet (flooding) state. The appropriate state refers to the state in which the moisture content is within the appropriate range, the dry state refers to the state in which the moisture content is a smaller amount than the appropriate range, and the wet state refers to the state in which the moisture content is a greater amount than the appropriate range. The appropriate range of the moisture content is provided in the range in which the characteristics of the fuel cell 2 can be satisfied.

The moisture state determination section 72 determines the moisture state in the fuel cell 2 by using an output voltage of the fuel cell 2 being that of when a current sweep is temporarily performed by the output current control section 71. The moisture state determination section 72 includes: a moisture content estimation section 72a (moisture content estimation means); a resistance component calculation section 72b (resistance component calculation means); and a moisture content calculation section 72c (moisture content calculation means); a moisture content determination section 72d (moisture content determination means); and a cell voltage determination section 72e (cell voltage determination means).

The moisture content estimation section 72a estimates the moisture content in the fuel cell 2 by using the value obtained by subtracting the amount of water taken out of the fuel cell 2 from the amount of water generated by the power generation of the fuel cell 2 (hereinafter referred to as the "water balance"). Specifically, the moisture content estimation section 72a estimates the moisture content in the fuel cell 2 by adding the currently-calculated water balance to the previously-estimated moisture content.

The amount of water taken out of the fuel cell can be calculated from the humidity and amount of gas at the cathode outlet of the fuel cell 2. The humidity of the gas can be calculated based on the temperature of the cooling water and the amount of power generation. Therefore, a map for calculating the humidity of the gas from the temperature of the cooling water and the amount of power generation may be obtained beforehand by experiments, etc. and stored in a memory 79.

Parameters for calculating the water balance may include, for example, a detection value of a current sensor A (current value of the fuel cell), a detection value of a temperature sensor T (temperature of the cooling water), a detection value of a pressure sensor P (cathode pressure of the fuel cell), a detection value of a flow rate sensor F (flow rate of the oxidant gas), a cathode humidity of the fuel cell (which may be assumed as 100% when unknown), etc.

The moisture content estimated by the moisture content estimation section 72a is stored in the previously estimated moisture content. However, when the moisture content is calculated by a moisture content calculation section 72c which will be described later, this calculated moisture content is stored in the previously estimated moisture content. Due to this, the estimated moisture content in which errors easily occur can be corrected by the highly accurate moisture content which is calculated by the moisture content calculation section 72c and thereby capable of improving the estimation accuracy of the moisture content.

The resistance component calculation section 72b calculates the resistance component in the fuel cell 2 by using the output current value and the output voltage value of the fuel cell 2 being that of when a current sweep is temporarily performed by the output current control section 71. The resistance component can be obtained by dividing the output voltage value by the output current value. When the change in the output voltage value with respect to the output current value is represented on a coordinate plane with the output current in a horizontal axis and the output voltage in a vertical axis, this resistance component is represented as an inclination of a graph depicted on the coordinate plane.

The moisture content calculation section 72c calculates the moisture content in the fuel cell 2 by using the resistance component calculated by the resistance component calculation section 72b. The moisture content, for example, can be calculated as described below. To begin with, there is a correlation between the resistance component and the moisture content in that the moisture content increases as the resistance component decreases, and the moisture content decreases as the resistance component increases. Thus, a map storing such a correlation is pre-stored in the memory 79. The moisture content calculation section 72c calculates the moisture content in the fuel cell by referencing the above map based on the resistance component calculated by the resistance component calculation section 72b and extracting the moisture content corresponding to the resistance component from the map.

The moisture content determination section 72d determines whether or not the moisture content estimated by the moisture content estimation section 72a or the moisture content calculated by the moisture content calculation section 72c is equal to or lower than the predetermined dry state threshold value. The moisture content to be compared with the dry state threshold value would generally be the moisture content estimated by the moisture content estimation section 72a. However, when the moisture content is calculated by the moisture content calculation section 72c, the moisture content to be compared would then be this calculated moisture content. In order to perform a determination based on such moisture content, for example, an item for determination referred to as the moisture content for determining the moisture state is provided, and this moisture content for determining the moisture state may be used to determine the moisture state as described below.

More specifically, each time the moisture content is estimated by the moisture content estimation section 72a, the estimated moisture content is stored in the moisture content for determining the moisture state. When the moisture content is calculated by the moisture content calculation section 72c, the calculated moisture content is used to update the content of the moisture content for determining the moisture state. Due to this, the estimated moisture content in which errors easily occur can be corrected by the highly accurate moisture content which is calculated by the moisture content calculation section 72c and thereby capable of accurately determining the moisture state of the fuel cell.

An upper limit moisture content that is capable of determining that the inside of the fuel cell is in a dry state can be set as the above dry state threshold value. This enables a determination that the moisture state in the fuel cell is in a dry state when the moisture content is equal to or lower than the dry state threshold value.

A cell voltage determination section 72e determines whether or not the minimum cell voltage of the cell voltages detected by a cell monitor while a current sweep is temporarily performed by the output current control section 71 has reached the predetermined wet state threshold value or lower. An upper limit voltage value that is capable of determining that the inside of the fuel cell is in a wet state can be set as the wet state threshold value. This enables a determination that the moisture state in the fuel cell is in a wet state when the cell voltage is equal to or lower than the wet state threshold value. The subject to be compared with the wet state threshold value is not limited to the minimum cell voltage. It may be determined whether or not any one of the cell voltages detected by the cell monitor has reached the wet state threshold value of lower.

The moisture content increasing processing section 73 performs a moisture content increasing process which increases the moisture content in the fuel cell when it is determined by the moisture content determination section 72d that the above moisture content is equal to or lower than the dry state threshold value. The moisture content increasing process corresponds to, for example, each of the following processes: a cathode stoichiometry decreasing process which decreases the flow rate of the compressor 31 and decreases the cathode stoichiometry; an oxidant gas pressure rising process which adjusts a back pressure valve 34 and raises the pressure of the oxidant gas in the fuel cell; a cooling water temperature decreasing process which decreases the temperature of the cooling water, for example, by driving a radiator fan 54.

The moisture content decreasing processing section 74 performs a moisture content decreasing process which decreases the moisture content in the fuel cell when it is determined by the cell voltage determination section 72e that the minimum cell voltage has reached the wet state threshold value or lower. The moisture content decreasing process corresponds to, for example, each of the following processes: an oxidant gas blow process which increases the flow rate of the compressor 31 and increases the flow rate of the oxidant gas; an oxidant gas pressure pulsation process which controls the degree of opening of the back pressure valve 34 and causes variation to the pressure of the oxidant gas in the fuel cell; and a number of fuel pump rotations increasing process which increases the number of rotations of the motor of the fuel pump 44. This enables recovery of the moisture content by determining the flooding without affecting the drivability.

Figure 3:
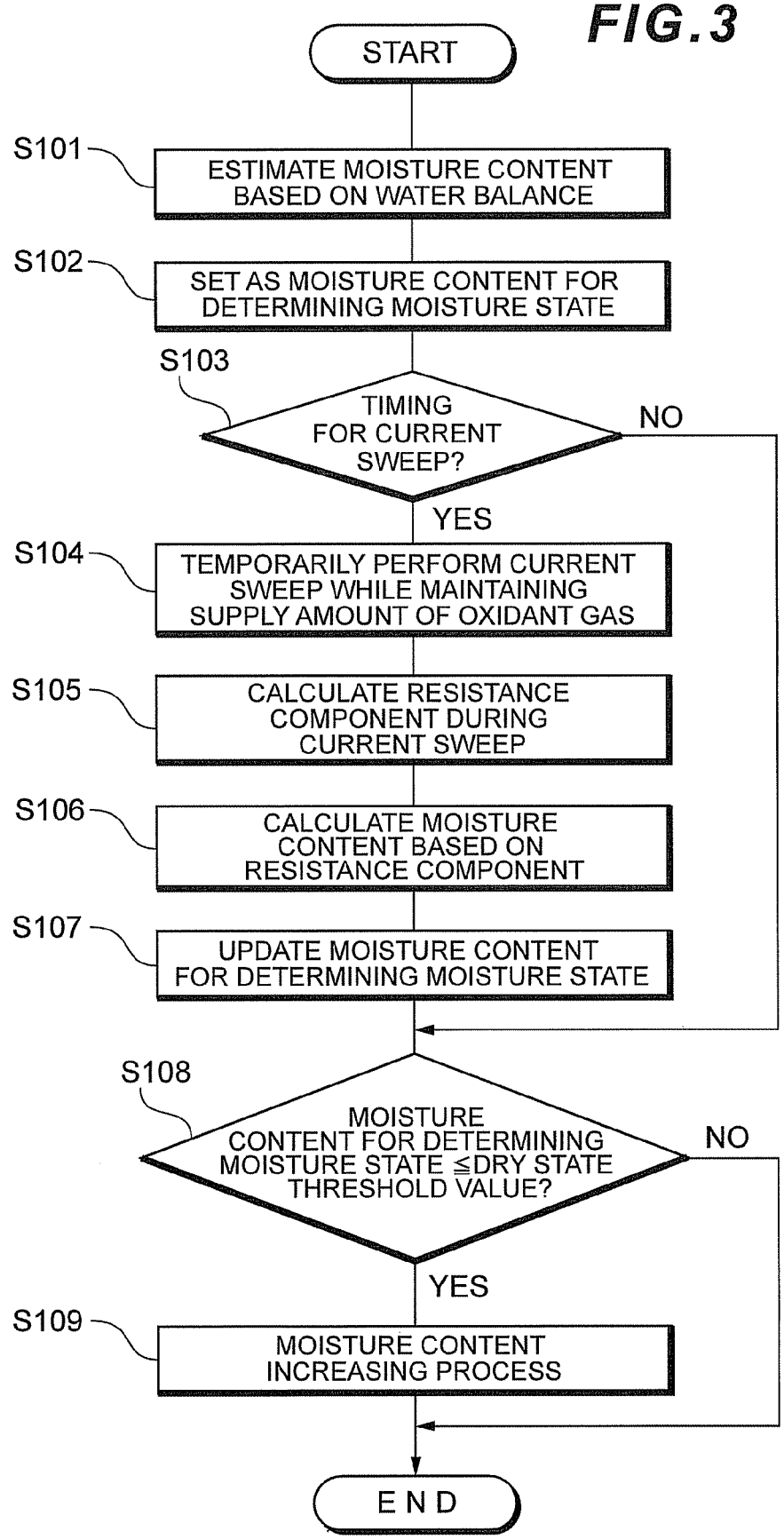
FIG. 3 is a flow chart for explaining a moisture state determination process in a first embodiment.
Figure 4:
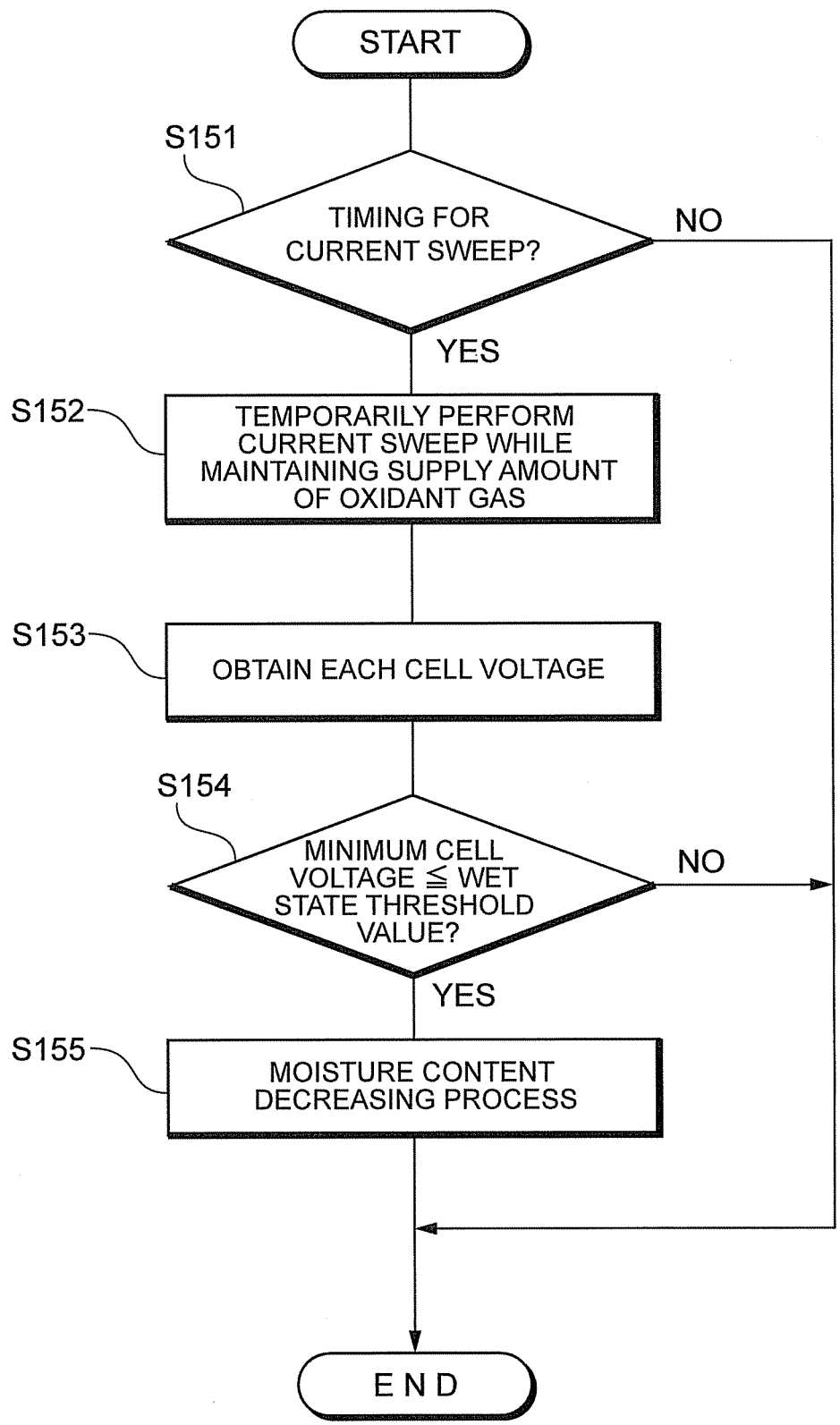
FIG. 4 is a flow chart for explaining a moisture state determination process in a first embodiment.

Next, the moisture state determination process which is performed in the fuel cell system of the present embodiment will be described using the flow charts shown in FIGS. 3 and 4. FIG. 3 is a flow chart for determining the dry state, and FIG. 4 is a flow chart for determining the wet state. These moisture state determination processes are processes that may be performed in parallel, and for example, they are started when the ignition key is turned ON and repeatedly performed until the operation ends.

The moisture state determination process for determining the dry state shown in FIG. 3 will now be described. Firstly, the moisture content estimation section 72a of the control section 7 estimates the moisture content in the fuel cell 2 based on the water balance (step S101) and sets this estimated moisture content as the moisture content for determining the moisture state (step S102).

Next, the control section 7 determines whether or not the current time is the timing for a current sweep (step S103), and if it is not the timing for a current sweep (step S103; NO), the process will proceed to step S108 which will be described later.

On the other hand, if the current time is the timing for a current sweep (step S103; YES), the output current control section 71 of the control section 7 temporarily performs the current sweep while maintaining the amount of oxidant gas to be supplied to the fuel cell 2 (step S104).

Then, the resistance component calculation section 72b of the control section 7 calculates the resistance component in the fuel cell 2 by using the output current value and the output voltage value of the fuel cell 2 being that of when a current sweep is temporarily performed by the output current control section 71 (step S105).

Then, the moisture content calculation section 72c of the control section 7 calculates the moisture content in the fuel cell 2 by using the resistance component calculated by the resistance component calculation section 72b (step S106) and updates the moisture content for determining the moisture state with the calculated moisture content (step S107).

Then, the moisture content determination section 72d of the control section 7 determines whether or not the moisture content for determining the moisture state is equal to or lower than the dry state threshold value (step S108). If it is determined to be NO (step S108; NO), the control section 7 ends the moisture state determination process.

On the other hand, when it is determined in the determination of the above step S108 that the moisture content for determining the moisture state is equal to or lower than the dry state threshold value (step S108; YES), the moisture content increasing processing section 73 of the control section 7 performs a moisture content increasing process (step S109).

Next, the moisture state determination process for determining the wet state shown in FIG. 4 will be described. Firstly, the control section 7 determines whether or not the current time is the timing for a current sweep (step S151), and if it is not the timing for a current sweep (step S151; NO), the control section 7 ends the moisture state determination process.

On the other hand, if the current time is the timing for a current sweep (step S151; YES), the output current control section 71 of the control section 7 temporarily performs the current sweep while maintaining the amount of oxidant gas to be supplied to the fuel cell 2 (step S152).

Then, the cell voltage determination section 72e of the control section 7 obtains each of the cell voltages detected by a cell monitor while a current sweep is temporarily performed by the output current control section 71 (step S153) and determines whether or not the minimum cell voltage of each of the cell voltages has reached the wet state threshold value or lower (step S154). If it is determined to be NO (step S154; NO), the control section 7 ends the moisture state determination process.

On the other hand, when it is determined in the determination of the above step S154 that the minimum cell voltage is equal to or lower than the wet state threshold value (step S154; YES), the moisture content decreasing processing section 74 of the control section 7 performs a moisture content decreasing process (step S155).

As described above, according to the fuel cell system 1 in the first embodiment, the moisture state in the fuel cell can be determined while maintaining the amount of oxidant gas to be supplied to the fuel cell 2. Moreover, the determination of whether or not the moisture content calculated based on the resistance component in the fuel cell is equal to or lower than the dry state threshold value enables a detection of whether or not the inside of the fuel cell is in a dry state. When the inside of the fuel cell is in a dry state, the moisture content in the fuel cell may be increased. In addition, the determination of whether or not the cell voltage is equal to or lower than the wet state threshold value enables a detection of whether or not the inside of the fuel cell is in a wet state. When the inside of the fuel cell is in a wet state, the moisture content in the fuel cell may be decreased.

Second Embodiment

The second embodiment of the present invention will now be described. The fuel cell system in the second embodiment is different from the fuel cell system in the first embodiment in that the fuel cell system in the second embodiment increases the supply amount of the oxidant gas in accordance with the increased required amount of power generation when the required amount of power generation is increased during the current sweep, whereas the fuel cell system in the first embodiment performs the current sweep while maintaining the supply amount of the oxidant gas. The difference between the configuration of the fuel cell system in the second embodiment and the configuration of the fuel cell system in the above first embodiment is that the fuel cell system in the second embodiment is provided with a new function at the control section 7. Since other configurations are similar to each of the configurations of the fuel cell system in the first embodiment, the same reference numerals have been provided to each of the elements and the descriptions thereof are omitted. The differences between the fuel cell systems in the first and second embodiments will mainly be described below.

Figure 5:
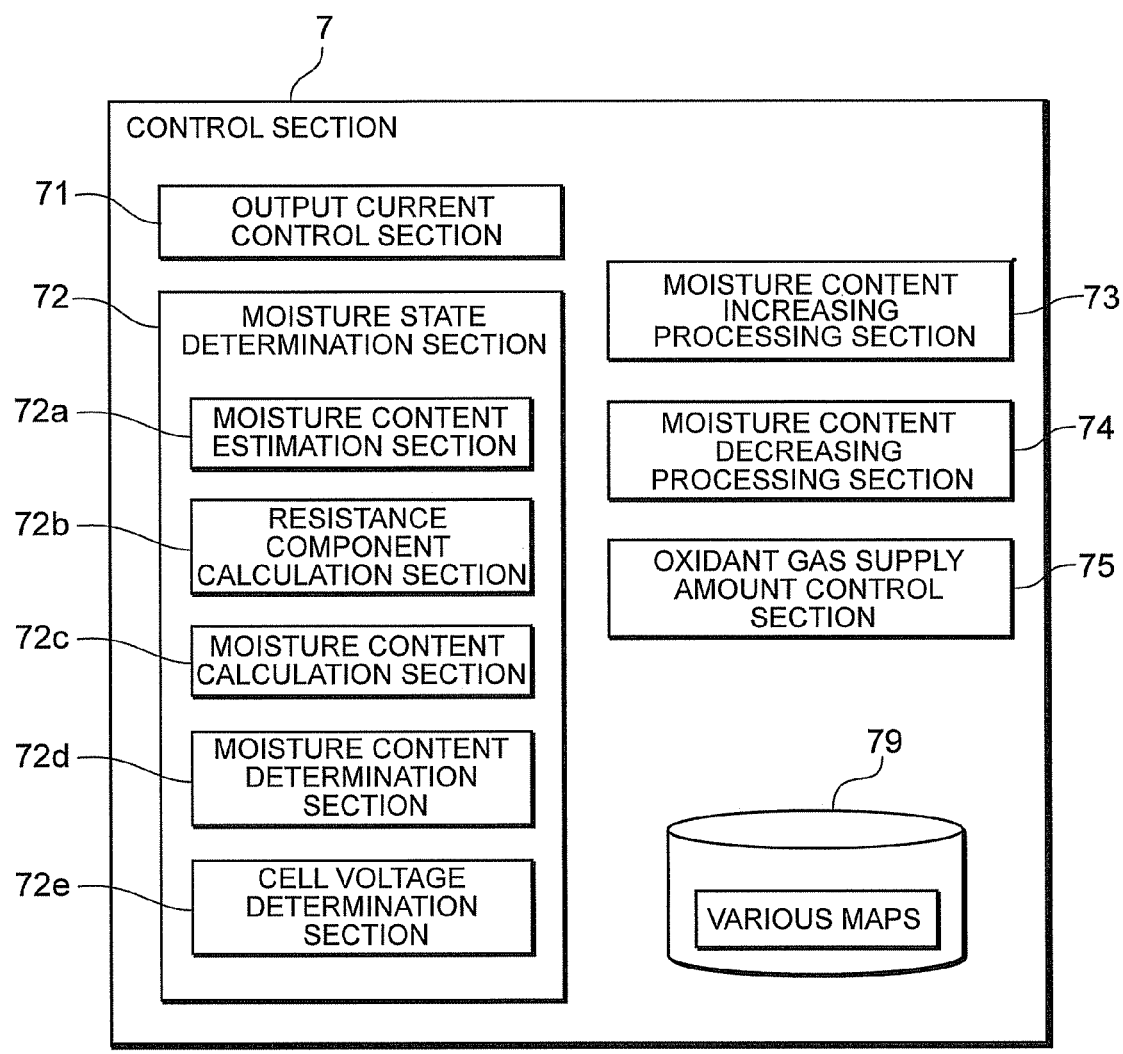
FIG. 5 is a block diagram showing a functional configuration of a control section in a second embodiment.

As shown in FIG. 5, the control section 7 in the second embodiment further comprises, in addition to each section in the first embodiment, an oxidant gas supply amount control section 75 (gas supply amount control means).

When the amount of power generation required by the traction motor 64 is increased when a current sweep is temporarily performed by the output current control section 71, the oxidant gas supply amount control section 75 increases the supply amount of the oxidant gas in accordance with the required amount of power generation. This enables a current sweep to be performed while supplying oxidant gas in accordance with the required amount of power generation even if the required amount of power generation is increased during the current sweep. Thus, it is capable to smoothly respond to the required load without delaying the supply of oxidant gas.

The resistance component calculation section 72b corrects the resistance component when the supply amount of the oxidant gas is increased by the oxidant gas supply amount control section 75. This is because the amount of remaining oxygen, remaining hydrogen, etc. changes when the supply amount of the oxidant gas during the current sweep is increased, thereby causing the resistance component to vary. For example, the correction of the resistance component may be performed as described below.

Since there is a correlation between the resistance component and the cathode pressure in that the resistance component decreases as the cathode pressure increases, a map storing such correlation is pre-stored in the memory 79. In the beginning, the resistance component calculation section 72b calculates the resistance component in the fuel cell 2 by using the output current value and the output voltage value of the fuel cell 2 being that of when a current sweep is temporarily performed by the output current control section 71. Then, the resistance component calculation section 72b obtains, from a pressure sensor P, the cathode pressures before and after the increase of the supply amount of the oxidant gas when the supply amount of the oxidant gas is increased by the oxidant gas supply amount control section 75. Then, the resistance component calculation section 72b references the above map based on the obtained cathode pressures and extracts from the map the resistance components corresponding to each of the cathode pressures. Then, the resistance component calculation section 72b calculates the degree of variability of the resistance component, by using the extracted resistance components, and corrects the resistance component that was calculated during the above current sweep by using this degree of variability.

There is a correlation between the resistance component and the cathode stoichiometry in that the resistance component decreases as the cathode stoichiometry increases, and there is a correlation between the resistance component and the cooling water temperature in that the resistance component decreases as the cooling water temperature increases. Thus, a map storing the correlation between the resistance component and the cathode stoichiometry or a map storing the correlation between the resistance component and the cooling water temperature may be used instead of the map storing the above correlation between the resistance component and the cathode pressure to correct the resistance component using the same procedure as that of the above correction method.

The method for correcting the resistance component is not limited to the above correction method. Other methods may be used if it is possible to obtain the resistance component in accordance with the conditions of the amount of gas, pressure, temperature, etc. which vary due to the increase of the supply amount of the oxidant gas during the current sweep.

Figure 6:
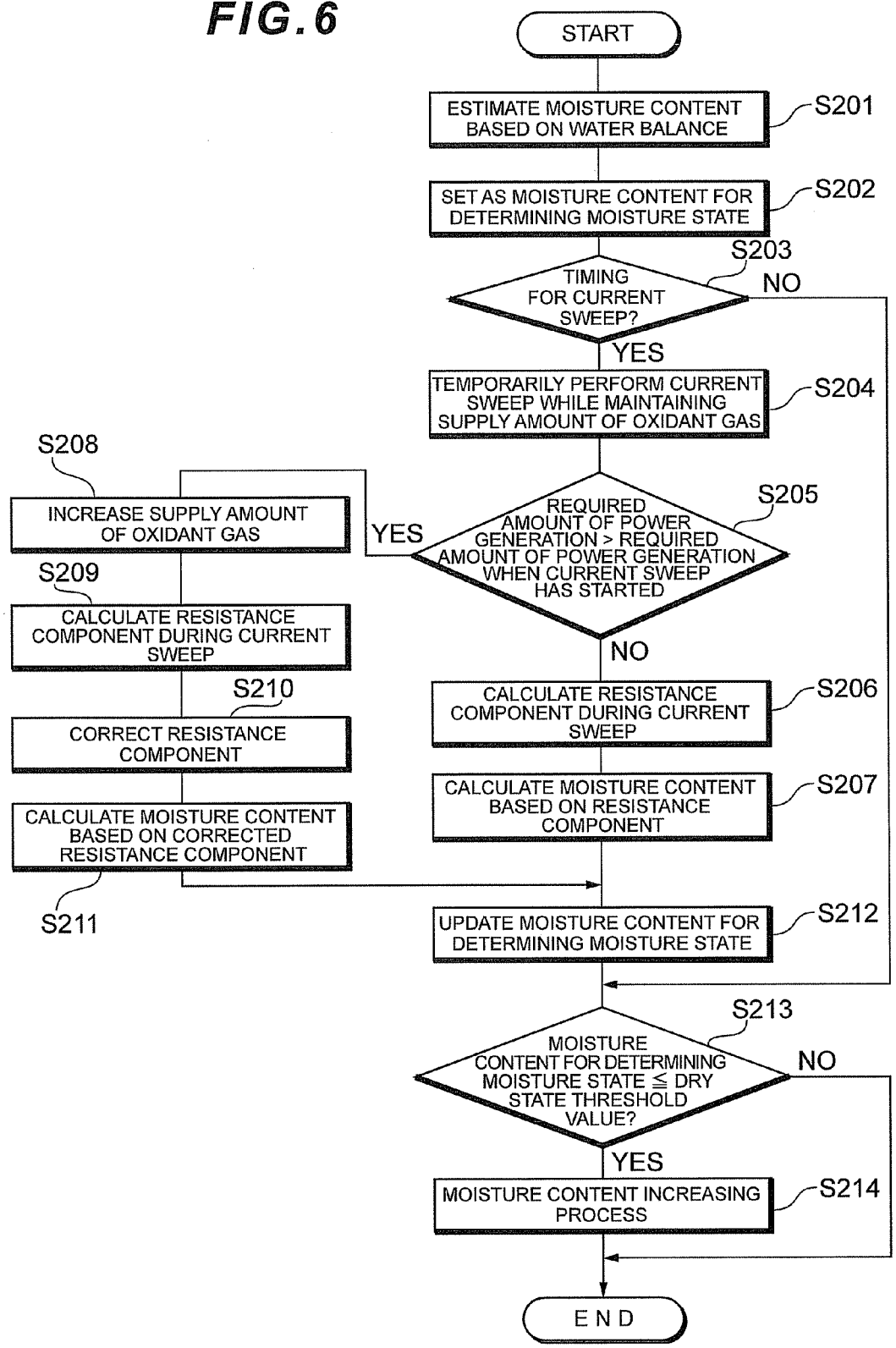
FIG. 6 is a flow chart for explaining a moisture state determination process in a second embodiment.

Next, referring to the flow chart shown in FIG. 6, a moisture state determination process that is performed in the fuel cell system in the second embodiment will be described. FIG. 6 is a flow chart for determining a dry state. This moisture state determination process is, for example, started when the ignition key is turned ON and repeatedly performed until the operation ends.

Firstly, the moisture content estimation section 72a of the control section 7 estimates the moisture content in the fuel cell 2 based on the water balance (step S201) and sets this estimated moisture content as the moisture content for determining the moisture state (step S202).

Then, the control section 7 determines whether or not the current time is the timing for a current sweep (step S203). If it is not the timing for the current sweep (step S203; NO), the process proceeds to step S213 which will be described later.

On the other hand, if the current time is the timing for a current sweep (step S203; YES), the output current control section 71 of the control section 7 starts the current sweep while maintaining the amount of oxidant gas to be supplied to the fuel cell 2 (step S204).

Then, the oxidant gas supply amount control section 75 of the control section 7 determines whether or not the required amount of power generation has increased more than the required amount of power generation being that of when the current sweep has started (step S205). If it is determined to be NO (step S205; NO), the resistance component calculation section 72b of the control section 7 calculates the resistance component in the fuel cell 2 by using the output current value and the output voltage value of the fuel cell 2 being that of when a current sweep is performed by the output current control section 71 (step S206). Then, the moisture content calculation section 72c of the control section 7 calculates the moisture content in the fuel cell 2 by using the resistance component that was calculated by the resistance component calculation section 72b (step S207) and updates the moisture content for determining the moisture state with this calculated moisture content (step S212). Then, the process proceeds to step S213 which will be described later.

On the other hand, when it is determined in the determination of the above step S205 that the required amount of power generation has increased more than the required amount of power generation being that of when the current sweep has started (step S205; YES), the oxidant gas supply amount control section 75 of the control section 7 increases the supply amount of the oxidant gas in accordance with the increased required amount of power generation (step S208).

Then, the resistance component calculation section 72b of the control section 7 calculates the resistance component in the fuel cell 2 by using the output current value and the output voltage value of the fuel cell 2 being that of when a current sweep is performed by the output current control section 71 (step S209) and corrects this calculated resistance component by referencing the above maps, etc. (step S210).

Then, the moisture content calculation section 72c of the control section 7 calculates the moisture content in the fuel cell 2 by using the corrected resistance component (step S211) and updates the moisture content for determining the moisture state with this calculated moisture content (step S212).

Then, the moisture content determination section 72d of the control section 7 determines whether or not the moisture content for determining the moisture state is equal to or lower than the dry state threshold value (step S213). If it is determined to be NO (step S213; NO), the control section 7 ends the moisture state determination process.

On the other hand, if it is determined in the determination of the above step S213 that the moisture content for determining the moisture state is equal to or lower than the dry state threshold value (step S213; YES), the moisture content increasing processing section 73 of the control section 7 performs the moisture content increasing process (step S214).

As described above, the fuel cell system 1 of the second embodiment provides similar effects to those of the fuel cell system 1 of the above first embodiment, and is also capable of performing a current sweep while supplying the oxidant gas in accordance with the required amount of power generation even if the required amount of power generation is increased during the current sweep. Thus, it is capable to smoothly respond to the required load without delaying the supply of oxidant gas.

Third Embodiment

The third embodiment of the present invention will now be described. The fuel cell system in the third embodiment is different from the fuel cell system in the first embodiment in that the fuel cell system in the third embodiment performs the moisture state determination process when the fuel cell is during an intermittent operation, whereas the fuel cell system in the first embodiment performs a moisture state determination process during a normal operation. The difference between the configuration of the fuel cell system in the third embodiment and the configuration of the fuel cell system in the above first embodiment is that the fuel cell system in the third embodiment is provided with a new function at the control section 7. Since the other configurations are similar to each of the configurations of the fuel cell system in the first embodiment, the same reference numerals have been provided to each of the elements and the descriptions thereof are omitted. The differences between the fuel cell systems in the first and third embodiments will mainly be described below.

The resistance component of the fuel cell 2 varies in accordance with the degradation state of the catalyst included in the fuel cell 2. Thus, in order to understand the moisture state in the fuel cell precisely, it is preferable to calculate the resistance component in accordance with the degradation state of the catalyst. However, the catalyst oxidizes due to its use. When the catalyst is oxidized, its surface is covered by an oxidized coating and the effective area is reduced. Thus, in order to understand the degradation state of the catalyst precisely, it is preferable to determine the degradation state after activating (reducing) the catalyst and equalizing the effective area of the catalyst. In the fuel cell system of the third embodiment, the moisture state determination process is performed during an intermittent operation, and the degradation state of the catalyst is determined after activating the catalyst and improving the determination accuracy of the degradation state, and then the resistance component is corrected in accordance with the determined degradation state.

Figure 7:
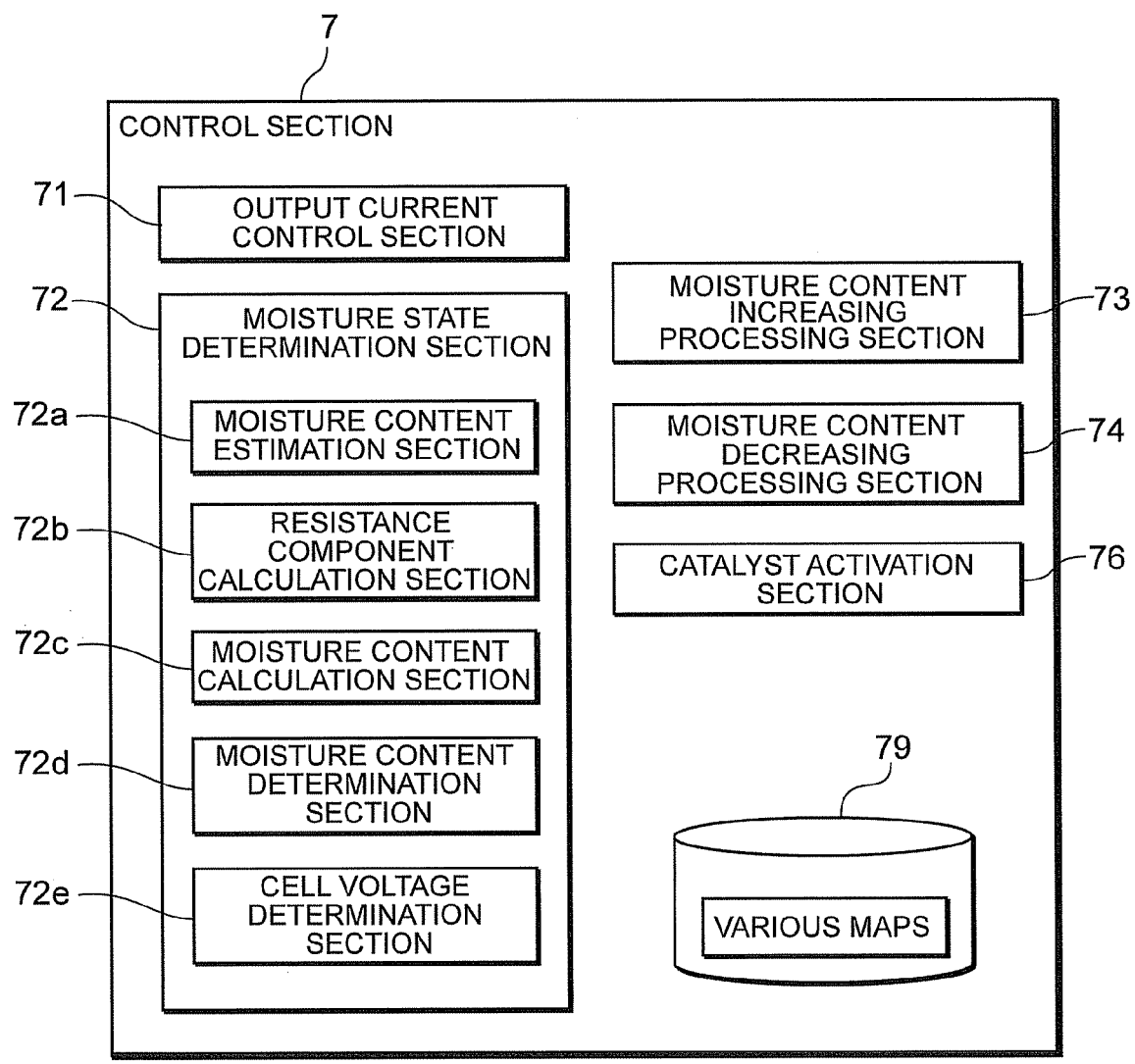
FIG. 7 is a block diagram showing a functional configuration of a control section in a third embodiment.

As shown in FIG. 7, the control section 7 in the third embodiment further comprises, in addition to each of the sections in the first embodiment, a catalyst activation section 76 (catalyst activation means).

The catalyst activation section 76 performs a catalyst activation process when the fuel cell 2 is during an intermittent operation. The catalyst activation process is a process for reducing and activating the catalyst by decreasing the output voltage of the fuel cell 2 to a voltage in a region in which a reduction reaction occurs to the catalyst (reduction region).

The output current control section 71 temporarily performs a current sweep while maintaining the supply amount of the oxidant gas, when the fuel cell 2 is during an intermittent operation. Intermittent operation involves two cases, a case where the supply of the oxidant gas is stopped, and a case where only a certain amount of oxidant gas is supplied. In either case, the output current control section 71 performs a current sweep while maintaining the supply amount of the oxidant gas at that point (0 or a certain amount).

The resistance component calculation section 72b determines the degradation state of the catalyst reduced by the catalyst activation section 76. The method for determining the degradation state of the catalyst may use well-known methods. The resistance component calculation section 72b corrects the resistance component in accordance with the determined degradation state of the catalyst. Specifically, the correlation between the degradation state of the catalyst and the resistance component is obtained by experiments, etc., and the obtained correlation is pre-stored in the map. The resistance component calculation section 72b extracts from the map the resistance component corresponding to the determined degradation state of the catalyst. The resistance component calculation section 72b uses the extracted resistance component to correct the resistance component calculated by the resistance component calculation section 72b.

The method for correcting the resistance component may use any kind of method as long as it is possible to obtain the resistance component in accordance with the conditions of the current value, voltage value, etc. which vary due to the degradation state of the catalyst.

Next, referring to the flow chart shown in FIG. 8, a moisture state determination process that is performed in the fuel cell system in the third embodiment will be described. FIG. 8 is a flow chart for determining a dry state. This moisture state determination process is, for example, started when the ignition key is turned ON and repeatedly performed until the operation ends.

To begin with, the control section 7 determines whether or not the operation state of the fuel cell 2 is in an intermittent operation (step S301), and if it is determined to be NO (step S301; NO), the control section 7 ends the moisture state determination process.

On the other hand, if the operation state of the fuel cell 2 is determined to be the intermittent operation (step S301; YES), the moisture content estimation section 72a of the control section 7 estimates the moisture content in the fuel cell 2 based on the water balance (step S302) and sets this estimated moisture content as the moisture content for determining the moisture state (step S303).

Then, the control section 7 determines whether or not the current time is the timing for a current sweep (step S304). If it is not the timing for the current sweep (step S304; NO), the process proceeds to step S311 which will be described later.

On the other hand, if the current time is the timing for a current sweep (step S304; YES), the catalyst activation section 76 of the control section 7 performs a catalyst activation process (step S305).

Then, the output current control section 71 of the control section 7 temporarily performs a current sweep while maintaining the amount of oxidant gas to be supplied to the fuel cell 2 (step S306).

Then, the resistance component calculation section 72b of the control section 7 calculates the resistance component in the fuel cell 2 by using the output current value and the output voltage value of the fuel cell 2 being that of when a current sweep is temporarily performed by the output current control section 71 (step S307), and corrects the calculated resistance component in accordance with the degradation state of the catalyst (step S308).

Then, the moisture content calculation section 72c of the control section 7 calculates the moisture content in the fuel cell 2 by using the corrected resistance component (step S309) and updates the moisture content for determining the moisture state with this calculated moisture content (step S310).

Then, the moisture content determination section 72d of the control section 7 determines whether or not the moisture content for determining the moisture state is equal to or lower than the dry state threshold value (step S311). If it is determined to be NO (step S311; NO), the control section 7 ends the moisture state determination process.

On the other hand, if it is determined in the determination of the above step S311 that the moisture content for determining the moisture state is equal to or lower than the dry state threshold value (step S311; YES), the moisture content increasing processing section 73 of the control section 7 performs the moisture content increasing process (step S312).

As described above, the fuel cell system 1 of the third embodiment provides similar effects to that of the fuel cell system 1 of the above first embodiment, and is also capable of performing a current sweep during an intermittent operation in which the supply amount of the oxidant gas, pressure, etc. does not vary. Thus, it is capable of accurately calculating the resistance component. In addition, since it is capable of determining the degradation state of the catalyst after activating the catalyst and correcting the resistance component in accordance with the determined degradation state, the moisture state of the fuel cell can be accurately determined.

The functional configurations of the control section in each of the above embodiments may be combined appropriately.

INDUSTRIAL APPLICABILITY

The fuel cell system according to the present invention is suitable for determining the moisture state of the fuel cell without causing any variance in the supply state of the reactant gas to be supplied to the fuel cell.

DESCRIPTION OF REFERENCE NUMERALS

1 . . . Fuel cell system; 2 . . . Fuel cell; 3 . . . Oxidant gas piping system; 4 . . . Fuel gas piping system; 5 . . . Cooling system; 6 . . . Electric power system; 7 . . . Control section; 31 . . . Compressor; 34 . . . Back pressure valve; 40 . . . Fuel tank; 44 . . . Fuel pump; 51 . . . Radiator; 53 . . . Cooling water circulation pump; 54 . . . Radiator fan; 61 . . . DC/DC converter; 62 . . . Battery; 64; Traction motor; 71 . . . Output current control section; 72 . . . Moisture state determination section; 72a . . . Moisture content estimation section; 72b . . . Resistance component calculation section; 72c . . . Moisture content calculation section; 72d . . . Moisture content determination section; 72e . . . Cell voltage determination section; 73 . . . Moisture content increasing processing section; 74 . . . Moisture content decreasing processing section; 75 . . . Oxidant gas supply amount control section; 76 . . . Catalyst activation section; 79 . . . Memory; V . . . Voltage sensor; A . . . Current sensor; P . . . Pressure sensor; T . . . Temperature sensor; F . . . Flow rate sensor.

What is claimed is:

1. A fuel cell system comprising:
   a fuel cell including a cell stack body in which a plurality of unit cells is stacked, the fuel cell generating electric power through an electrochemical reaction of a reactant gas which is supplied to the cell stack body;
   an output current control section programmed for temporarily increasing an output current of the fuel cell by reducing the voltage of the fuel cell to a voltage lower than the required voltage and taking out a current larger than the required current from the fuel cell while maintaining an amount of the reactant gas to be supplied to the fuel cell;
a resistance component calculation section that is programmed to calculate a resistance component from an output current value and an output voltage value of the fuel cell being that of when the output current is temporarily increased by the output current control section;
a moisture content calculation section that is programmed to calculate the moisture content in the fuel cell corresponding to the resistance component calculated by the resistance component calculation section;
a moisture content determination section that is programmed to determine whether or not the moisture content calculated by the moisture content calculation section is equal to or lower than a dry state threshold value, which is for determining the dry state; and
a moisture content increasing section that is programmed to perform a moisture content increasing process which increases a moisture content in the fuel cell, when it is determined by the moisture content determination section that the moisture content is equal to or lower than the dry state threshold value,
wherein the output current control section is programmed to increase the output current of the fuel cell, whereby the current and the time are determined based on the amount of electric power that can be supplied by the remaining oxygen and the remaining hydrogen in a catalyst of the fuel cell.

2. The fuel cell system according to claim 1, wherein the moisture state determination section further includes a moisture content estimation section that is programmed to estimate the moisture content in the fuel cell by using a value obtained after subtracting an amount of water carried outside the fuel cell from an amount of water generated by a power generation of the fuel cell,
wherein when the dry state in the fuel cell is to be determined, the moisture content determination section is programmed to determine whether or not the calculated moisture content is equal to or lower than the dry state threshold value when the moisture content is calculated by the moisture content calculation section, and determines whether or not the moisture content estimated by the moisture content estimation section is equal to or lower than the dry state threshold value when the moisture content is not calculated by the moisture content calculation section.

3. The fuel cell system according to claim 1, wherein the output current control section is programmed to temporarily increase the output current of the fuel cell while maintaining a supply amount of the reactant gas, when the fuel cell is during an intermittent operation.

4. The fuel cell system according to claim 3, further comprising a catalyst activation section that is programmed to output during the intermittent operation, a current from the fuel cell such that a voltage of the fuel cell is within a reduction region of a catalyst included in the fuel cell,
Wherein the resistance component calculation section is programmed to correct the resistance component in accordance with a degradation state of the catalyst activated by the catalyst activation section.

5. The fuel cell system according to claim 1, further comprising:
a power consuming apparatus that consumes electric power from the fuel cell; and
a gas supply amount control section that is programmed to increase a supply amount of the reactant gas in accordance with a required amount of power generation, when the required amount of power generation from the power consuming apparatus is increased while the output current is temporarily increased by the output current control section,
wherein the resistance component calculation section is programmed to correct the resistance component when the supply amount of the reactant gas is increased by the gas supply amount control section.

6. The fuel cell system according to claim 1, further comprising a moisture content decreasing section that is programmed to perform a moisture content decreasing process which decreases the moisture content in the fuel cell, when it is determined by the moisture state determination section that the moisture state in the fuel cell is a wet state.

7. The fuel cell system according to claim 6, wherein the moisture state determination includes a cell voltage determination section that is programmed to determine whether or not any of the voltages detected by a cell voltage dection that detects the voltage of the unit cell has reached a wet state threshold value or lower, which is for determining the wet state, while the output current is temporarily increased by the output current control section,
wherein the moisture content decreasing section is programmed to perform the moisture content decreasing process when it is determined by the cell voltage determination section that the voltage has reached the wet state threshold value or lower.

\* \* \* \* \*